F. M. KIGER.
MILK AND CREAM SEPARATOR FOR BOTTLES.
APPLICATION FILED SEPT. 16, 1910.
1,058,599.
Patented Apr. 8, 1913.
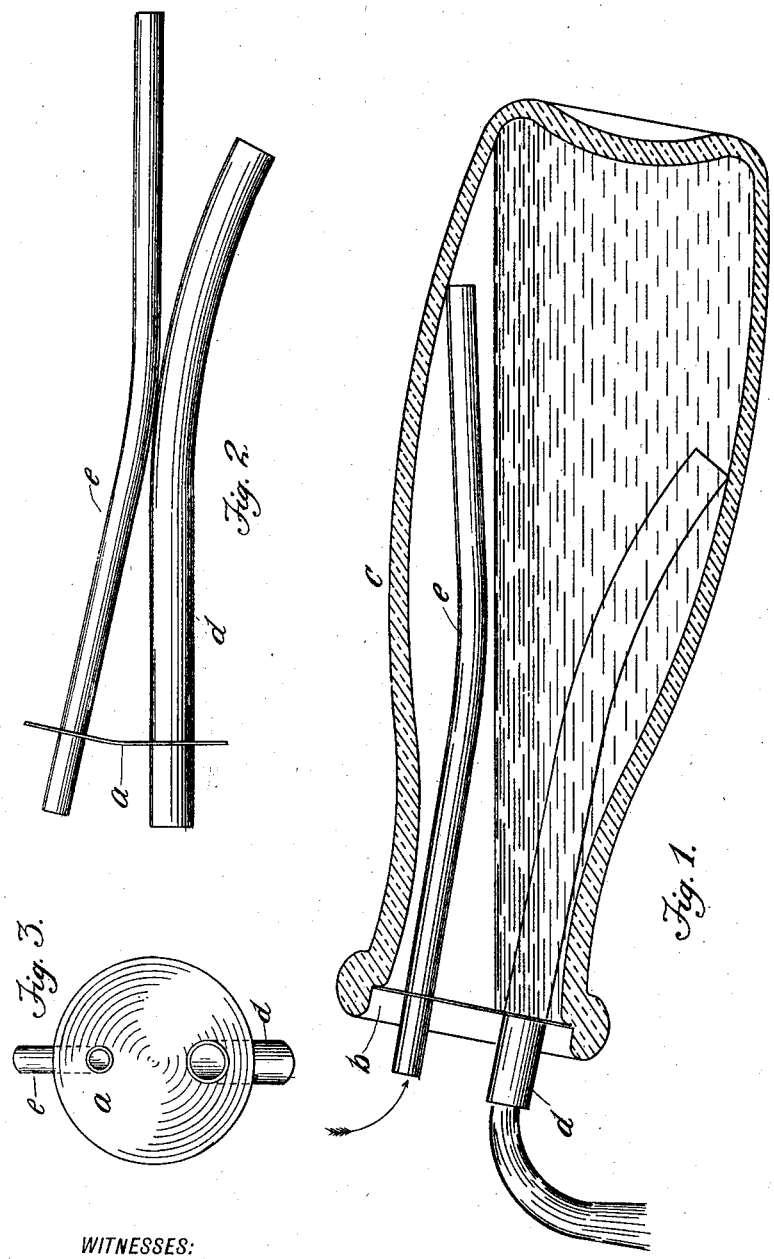

UNITED STATES PATENT OFFICE.

FRANK M. KIGER, OF GRESHAM, OREGON.

MILK AND CREAM SEPARATOR FOR BOTTLES.

1,058,599.  Specification of Letters Patent.  Patented Apr. 8, 1913.

Application filed September 16, 1910. Serial No. 582,407.

*To all whom it may concern:*

Be it known that I, FRANK M. KIGER, a citizen of the United States, and a resident of Gresham, in the county of Multnomah and State of Oregon, have invented a new and useful Improvement in Milk and Cream Separators for Bottles, of which the following is a specification.

It is the custom, as well known, at the present time to pour the fresh milk at the dairy into bottles which are afterward sealed and so delivered to the customers, to assure and guarantee that each customer will receive the same proportions of milk and cream as contained in the milk in its original state. After the bottle has stood a while the cream will gather at the top, and frequently the housekeeper finds it convenient to draw off the cream, for use in coffee and other special purposes, and then use the milk in cooking.

With this knowledge in view, my invention has for its object to provide an inexpensive device by which, under the conditions referred to, the heavier milk can be withdrawn from the bottle, so as to leave the lighter cream remaining therein, which may finally be poured into another pitcher.

To this end my invention comprises the special arrangement of parts and features hereinafter fully described.

In the accompanying drawings: Figure 1 is a longitudinal section of a bottle into which my device is inserted, as in practice; the bottle is represented as containing milk which is supposed to have been standing for a sufficient time to cause the formation of an upper stratum of cream; and this view illustrates the operation of my device to pour out the heavier milk-portion of the liquid, thus separating it from the cream and leaving the latter in the bottle; Fig. 2 is a side elevation of my device, showing the two tubes of my device brought together by the reflex action of the shield, thereby so arranging the two tubes as to be able to insert them in the neck of a milk bottle; and Fig. 3 is a top view of my device, looking at the shield straightened out, thus causing the tubes to spread apart, as shown in Fig. 1; this being the natural arrangement when my device is secured in the neck of a bottle.

My device consists of a circular seal or shield, $a$, which may be made of any suitable material, preferably flexible and resilient, so as to be more readily seated in the neck, $b$, of the bottle $c$, as shown in Fig. 1. In the circular shield, $a$, is secured one end of a tube $d$ for pouring out the liquid, and hence preferably of larger diameter, and an air tube, $e$, of smaller diameter. The tubes, $d$, $e$, are curved, as shown, so as to bring the inner ends thereof against the top and bottom sides of the bottle, as shown in Fig. 1; for the inlet end of the air tube must be kept above the liquid. Some flexibility of the shield, $a$, is also required so as to permit the tubes, $d$, $e$, to be brought together, as illustrated in Fig. 2, for insertion in the bottle. Resiliency is, furthermore, a convenient property of the shield $a$, to insure that before my device is inserted in the bottle the reflex action of the seal will bring the two tubes together at their bend, as shown in Fig. 2, and thus arrange them for insertion in the bottle, and when the shield is inserted in the bottle, straightened out, the tubes will be simultaneously spread apart, as shown in Fig. 1. The shield, $a$, may be made of metal, but when so made, in order to render it liquid-tight, when seated upon the inner shoulder $f$ of the milk bottle, I place a disk of any suitable material under it.

When using my device, the usual paper seal of the bottle is first removed, and then my device is inserted as illustrated in Fig. 1, supposing that the milk has been standing for a sufficient time to separate the cream and cause it to float on the milk in the form of a top stratum, as usual. The bottle is then so manipulated that the tube $d$ draws out the more limpid, milk portion of the liquid, while the cream, represented in Fig. 1 by the heavier and closer broken lines, will remain in the bottle. The device is then removed and cleaned and put away for future use. The tubes, $d$, $e$, may be made of any material found convenient, and they may be either permanently or removably inserted in the circular shield $a$.

Instead of arranging my device as above described, the tubes, $d$, $e$, may be rotatably or adjustably held in the shield $a$, given a quarter turn to bring them side by side, for insertion in the bottle, and, after having been so inserted, turned back, so as to spread the lower ends of said tubes apart and against the opposite sides of the bottle, as mentioned. I prefer merely the automatic form, so as to render the use of my device convenient, and to assure that when inserted in the bottle of milk it will be properly arranged, for operating as described.

I claim:

A milk and cream separator consisting of a wafer-like disk or shield made of resilient material so as to be adapted to be removably sprung into place in the mouth of a container the neck of which is formed with an interior circumferential shoulder, a liquid pouring tube secured in said shield and curved outward, and an air inlet tube also secured in said shield and curved in the opposite direction, both of said tubes being made of sufficient length so as to extend toward the bottom of the container in which they are to be inserted; said shield being adapted to cause the act of seating said shield on the shoulder in the neck of a bottle to spring and hold the inner ends of said tubes against the opposite sides of the container, and when the shield is removed from the neck to cause the shield to automatically so bend as to bring the two tubes together, whereby the insertion of the tubes and their removal from the container is facilitated.

FRANK M. KIGER.

Witnesses:
S. H. HAINES,
C. LONG.

---

Copies of this patent may be obtained for five cents each, by addressing the "Commissioner of Patents, Washington, D. C."